J. T. TROTT.
Soft Cake Machine.

No. 222,212.  Patented Dec. 2, 1879.

Witnesses:
Frank C. Redness
Francis H. Foster

Inventor:
John T. Trott
per
Chas. G. Root, atty.

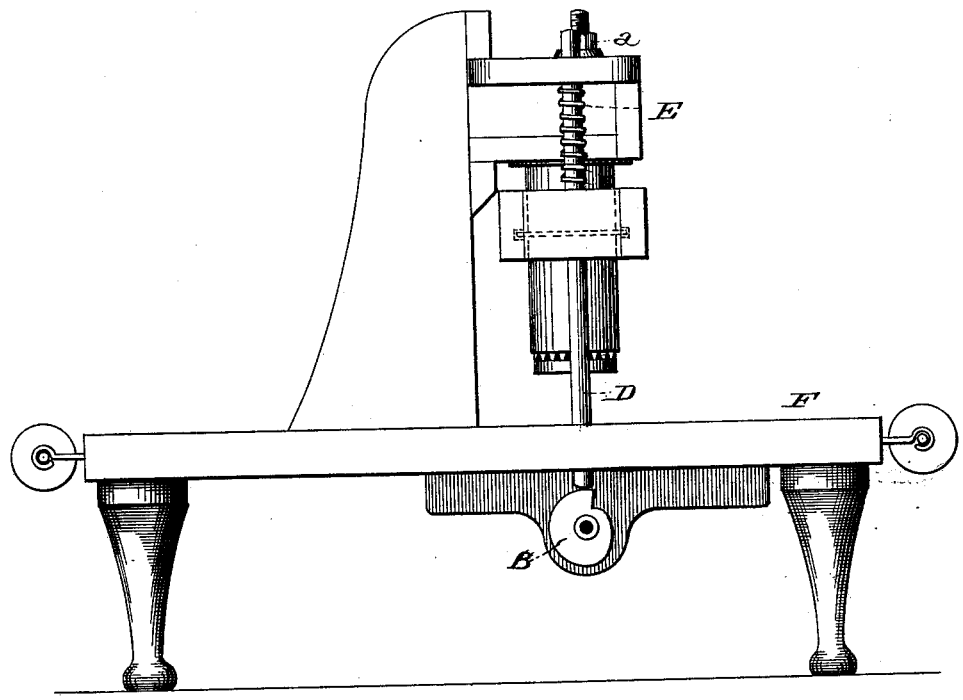

UNITED STATES PATENT OFFICE.

JOHN T. TROTT, OF WATERBURY, CONNECTICUT.

IMPROVEMENT IN SOFT-CAKE MACHINES.

Specification forming part of Letters Patent No. 222,212, dated December 2, 1879; application filed January 23, 1879.

*To all whom it may concern:*

Be it known that I, JOHN T. TROTT, of the town of Waterbury, in the county of New Haven and State of Connecticut, have invented a new and useful Improvement in Soft-Cake and Drop Machines, which improvement is fully set forth in the following specification and accompanying drawings, in which—

Figure 1:
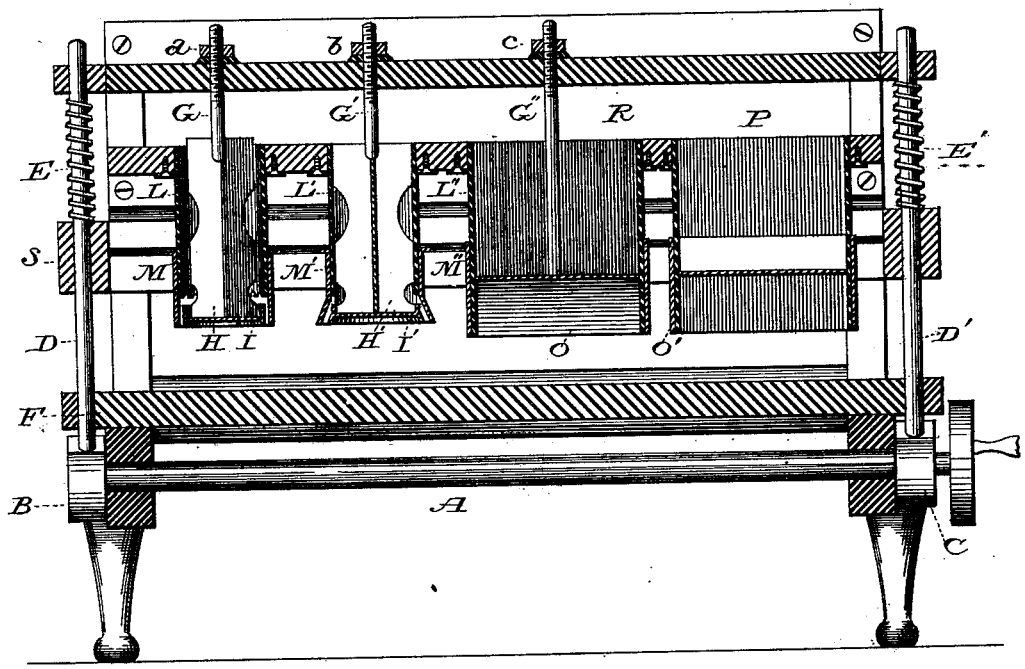
Figure 2:
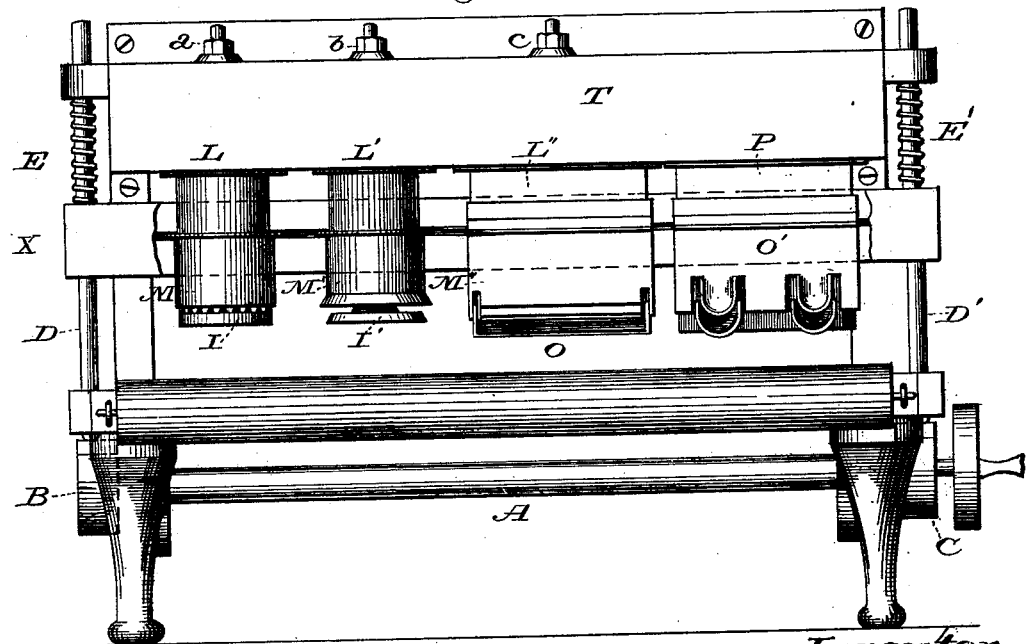

Figure 1 is a vertical section of my soft-cake and drop machine. Fig. 2 is a front elevation of the same with the front bar removed, and Fig. 3 is a side elevation of my machine.

The object of my invention is to furnish a machine by means of which dough is pressed into certain shapes and dropped upon pans ready for baking.

The machine is to be placed in front of a stuffing-box, from which the dough is pressed into the distributing-tubes by means of a movable plunger, or by any other means.

In the drawings, L L' are tubes for making jumbles. L'' is a tube for making fingers, and P is a tube for making a small cake or drop. G, G', and G'' are pins running up through the tubes L, L', and L'', respectively. H and H' are arms around the pins to hold them in the center of their respective tubes. M, M', M'', and O' are slides or rings, moving upon the tubes L, L', L'', and P, the said slides or rings being fixed, by means of flanges, in grooves in the front bar, X, and back bar, S, so as to move up and down with the front and back bars. The said slides are so made as to work easily on the tubes without any friction. I, I', and O are forming-plates, attached to the pins G G' G'', and corresponding with the openings of the tubes, and are regulated by nuts $a$, $b$, and $c$ on the top of the receiving-chamber.

When the forming-plates are raised, of course the cakes dropping out of the tubes around and over the forming-plates will be smaller than when the forming-plates are lowered. These forming-plates may be either straight with the tubes or beveled, as necessity or the consistency of the dough may require.

A is a shaft under the bed of the machine F, having the cams B and C attached thereto. D and D' are pins passing from the top of the receiving-chamber through the bars connecting the front and back bars and the bed of the machine, and working upon the cams B and C.

The pins D and D' are fixed immovably in the end bars, connecting the front and side bars, and move freely in the top of the receiving-chamber and in the bed of the machine, so that when the cams elevate these pins the front and back bars will be raised.

E and E' are springs placed around the pins D and D', between the top of the receiving-chamber and the end bars, connecting the front and back bars, so that when the cams permit the pins D and D' to fall they will fall with force sufficient to cut off the dough that has been pressed out of the distributing-tubes. The slides or rings attached to the front and back bars will cut off the dough that has been pressed out, and the dough will then fall upon the pans placed under the tubes in the required shapes.

The tube P has two holes provided with lips, over which the dough passes, and when the slide O' is pressed down by the springs the dough is cut off and falls upon the pan under it. These holes may be made of any shape, thus giving to cakes any form required.

R is the receiving-chamber, which opens at the back of the machine. T is a bar, forming the face of the receiving-chamber R.

The dough, being pressed from the stuffing-box by the plunger, or by any other means, enters the receiving-chamber R, passes down the distributing-tubes L, L', L'', and P, and issues from the tubes over the forming-plates I I' O and through the holes in the tube P, being cut off by the slides M, M', M'', and O, which, being fixed to the front and back bars, X and S, are moved up and down by the cams B and C acting upon the pins D and D'. The dough thus pressed out and cut off falls upon pans placed to receive it, and the same thing is repeated with every revolution of the shaft A.

Having thus described my invention, what I claim as new, and desire to secure by Letters Patent, is—

1. In a cake-machine, the combination of shaft A, cams B and C, connected therewith, pins D and D', springs E and E', front bar, X, back bar, S, tube L, pin G, arms H, forming-plate I, slide M, and nut $a$, substantially as shown and described.

2. In a cake-machine, the combination of tube L, pin G, arms H, forming-plate I, nut $a$, slide M, and a mechanism, substantially as described, operating slide M, substantially as shown and described.

3. In a cake-machine, the combination of the tube L, forming-plate I, slide M, and a mechanism, substantially as described, operating slide M, all substantially as shown and described.

JOHN T. TROTT.

Witnesses:
FRANKLIN L. WELTON,
NELSON P. WELTON.